US010781976B2

(12) United States Patent
Fay et al.

(10) Patent No.: US 10,781,976 B2
(45) Date of Patent: Sep. 22, 2020

(54) SYSTEMS AND METHODS FOR COMPRESSION PACK PIPE INSULATION

(71) Applicant: JOHNS MANVILLE, Denver, CO (US)

(72) Inventors: Ralph Michael Fay, Lakewood, CO (US); Jason J Koravos, North Chelmsford, MA (US); Dennis A Kopp, Dublin, OH (US)

(73) Assignee: Johns Manville, Denver, CO (US)

( * ) Notice: Subject to any disclaimer, the term of this patent is extended or adjusted under 35 U.S.C. 154(b) by 305 days.

(21) Appl. No.: 15/586,082

(22) Filed: May 3, 2017

(65) Prior Publication Data

US 2018/0320824 A1   Nov. 8, 2018

(51) Int. Cl.
| | | |
|---|---|---|
| *B32B 3/14* | (2006.01) | |
| *B32B 5/18* | (2006.01) | |
| *F16L 59/14* | (2006.01) | |
| *F16L 59/02* | (2006.01) | |
| *F17C 13/00* | (2006.01) | |
| *B32B 1/08* | (2006.01) | |
| *B32B 15/082* | (2006.01) | |
| *F16L 59/08* | (2006.01) | |

(52) U.S. Cl.
CPC .............. *F17C 13/001* (2013.01); *B32B 1/08* (2013.01); *B32B 3/14* (2013.01); *B32B 5/18* (2013.01); *B32B 15/082* (2013.01); *F16L 59/08* (2013.01); *F16L 59/141* (2013.01); *B32B 2266/02* (2013.01); *B32B 2266/057* (2016.11); *B32B 2307/304* (2013.01); *B32B 2307/7246* (2013.01); *B32B 2597/00* (2013.01); *F16L 59/028* (2013.01); *F17C 2203/0308* (2013.01); *F17C 2203/0325* (2013.01); *F17C 2203/0329* (2013.01); *F17C 2205/00* (2013.01); *F17C 2209/22* (2013.01)

(58) Field of Classification Search
CPC ............ F17C 13/001; F17C 2203/0325; F17C 2203/0308; F17C 2203/0329; F17C 2209/22; F17C 2205/00; F16L 59/08; F16L 59/141; F16L 59/028; B32B 15/082; B32B 3/14; B32B 2307/304; B32B 2266/02; B32B 2266/057; B32B 2597/00; B32B 2307/7246

See application file for complete search history.

(56) References Cited

U.S. PATENT DOCUMENTS

| | | |
|---|---|---|
| 6,887,563 B2 | 5/2005 | Frank et al. |
| 7,780,890 B2 | 8/2010 | Lee et al. |
| 8,616,246 B2 | 12/2013 | Dinon et al. |
| 8,784,962 B2 | 7/2014 | Weidinger et al. |
| 9,517,069 B2 | 12/2016 | Zilla et al. |
| 9,556,615 B1 | 1/2017 | Zettell |

(Continued)

OTHER PUBLICATIONS

Armacell Enterprise GMBH, ArmaSound Industrial Systems, Germany.

(Continued)

*Primary Examiner* — Lee A Holly
(74) *Attorney, Agent, or Firm* — Robert D. Touslee

(57) ABSTRACT

An insulation product for a pipe or vessel having at least one aerogel insulation layer, an additional insulation layer positioned around the at least one aerogel insulation layer, and a protective cladding layer surrounding the at least one aerogel insulation layer and the additional insulation layer.

12 Claims, 10 Drawing Sheets

(56) References Cited

U.S. PATENT DOCUMENTS

| | | | |
|---|---|---|---|
| 2002/0074916 A1* | 6/2002 | Wenning | B32B 27/06 312/406 |
| 2010/0187237 A1* | 7/2010 | Brooks | F17C 1/12 220/560.04 |
| 2016/0340064 A1 | 11/2016 | Loda | |

OTHER PUBLICATIONS

Custom Laminating Corporation, 8923 Polyester/Foil/Polyester Tentative Specification, www.CustomL.com.
Foamglas Industry, Pittwrap SS Jacketing Product Data Sheet, 2014, Pittsburgh Corning Corporation, US.
Ulva Insulation Systems LTD, ULVAShield Non-Metallic Insulation Cladding.
Venturetape, VentureClad 1577CW Jacketing System.
Monier Roofing Components GMBH, WRAPTEC Universal cladding and jacketing solution for insulated HVAC ducts and pipes, www.monier.com.

* cited by examiner

SYSTEMS AND METHODS FOR COMPRESSION PACK PIPE INSULATION

BACKGROUND OF THE INVENTION

Industrial tanks and vessels used for cryogenic applications are typically insulated by exterior applied insulations, such as cellular glass or PIR foam combined with one or more vapor barrier layers. In applications where higher performance and lower boil off are desired, storage tanks are often constructed as double wall vessels. Typically, in such applications the annulus space is filled with MLI, expanded perlite, or JM Cryolite® insulation, sealed, and then evacuated. Up to 20% of the cryogenic piping at LNG facilities that export products have requirements to meet certain noise standards. The compressors used in the liquefaction process generate loud noise that is radiated along all the pipes connected to the compressor. Conventional insulation for cryogenic applications often include a thermal insulator covered by an acoustic insulator. A typical acoustic treatment uses one or more layers of 2" thick×8 pcf mineral fiber and a mass loaded vinyl covering to deliver either Class B or Class C per ISO 15665 (Acoustic insulation for pipes, valves, and flanges). Typically, such cryogenic applications require custom made shapes and sizes of insulation that significantly increases the cost and time associated with insulating a pipe or vessel.

BRIEF SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the invention relate to an insulation and insulation systems for pipes, storage tanks, and vessels. The insulation and insulation systems described herein provide excellent thermal and acoustic performance with minimal thickness compared to conventional insulation solutions. The present insulations are particularly useful for applications involving cryogenic liquid storage tanks and other storage containers that store liquids below 300° F. where insulation thickness needs to be minimized. The insulations may also be used in applications that utilize traditional cryogenic insulation, such as cellular glass or PIR foam, but that also require acoustic performance without adding significant thickness. Additionally, the insulation and insulation systems of the present invention are faster and easier to install than conventional insulation products.

In one aspect, an insulation product for a pipe or vessel, the insulation product is provided. The insulation product may include at least one aerogel insulation layer, an additional insulation layer positioned around the at least one aerogel insulation layer, and a protective cladding layer surrounding the at least one aerogel insulation layer and the additional insulation layer. In some embodiments, a vapor barrier layer may be positioned adjacent an outer surface of the additional insulation layer. In one embodiment, the additional insulation layer may be a first additional insulation layer. The insulation product may also include a second additional insulation layer positioned around the vapor barrier layer. In some embodiments, the insulation product may also include a sheath layer positioned between the at least one aerogel insulation layer and the additional insulation layer. The sheath layer may include polyethylene.

In some embodiments, the additional insulation layer may include one or more of cellular glass and a thermoset plastic foam. In some embodiments, the at least one aerogel insulation layer may include one or more of aerogel compression insulation packets, an aerogel thermal wrap, and a flexible aerogel blanket. A space between the at least one aerogel layer and the additional insulation layer may include one or both of a non-abrasive material or a non-abrasive treatment. In some embodiments, the at least one aerogel insulation layer includes aerogel compression insulation packets, which may have a thickness of between about 0.25 inches and about 1.5 inches in an expanded state. The protective cladding layer may include mass loaded vinyl bounded to a metal jacket.

In another aspect, an insulation product for a pipe or vessel may include at least one aerogel insulation layer, a first additional insulation layer positioned around the at least one aerogel insulation layer, a second additional insulation layer positioned around the first additional insulation layer, a vapor barrier layer positioned adjacent an outer surface of the second additional insulation layer, and a protective cladding layer surrounding the at least one aerogel insulation layer, the first additional insulation layer, the second additional insulation layer, and the vapor barrier layer. In some embodiments, the vapor barrier layer is a first vapor barrier layer and the insulation product further includes a second vapor barrier layer positioned between the first additional insulation layer and the second additional insulation layer. In some embodiments, the insulation product may include a sheath layer positioned between the at least one aerogel insulation layer and the first additional insulation layer. In some embodiments, the at least one aerogel layer includes carbon black.

In another aspect, a method of installing an insulation product on a pipe or vessel is provided. The method may include securing an aerogel layer around the pipe or vessel, positioning a constraining layer around the aerogel layer, and securing a protective cladding layer around the aerogel layer and the constraining layer. In some embodiments, the method may include positioning a vapor barrier layer around the constraining layer. The method may further include applying an additional insulation layer around the aerogel layer and the constraining layer. In some embodiments, the at least one aerogel insulation layer may include aerogel compression insulation packets. The method may also include positioning the aerogel layer around the pipe or vessel by arranging a plurality of aerogel insulation packets around an outer surface of the pipe or vessel in a compressed state. The method may further include puncturing the plurality of aerogel insulation packets upon positioning the constraining layer, thereby causing the plurality of aerogel insulation packets to expand. In some embodiments, the constraining layer may be a sheath layer or an additional insulation layer. In some embodiments where the aerogel layer include a plurality of aerogel insulation packets, the method may further include analyzing, using a computing device, a surface of the pipe or vessel to be insulated and determining, using the computing device, an arrangement of the plurality of aerogel insulation packets to cover the surface of the pipe or vessel. The plurality of aerogel insulation packets may include prefabricated aerogel insulation packets having one or more of different shapes and different sizes. Securing the aerogel layer may involve securing the prefabricated aerogel insulation packets on the surface of the pipe or vessel according to the determined arrangement.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
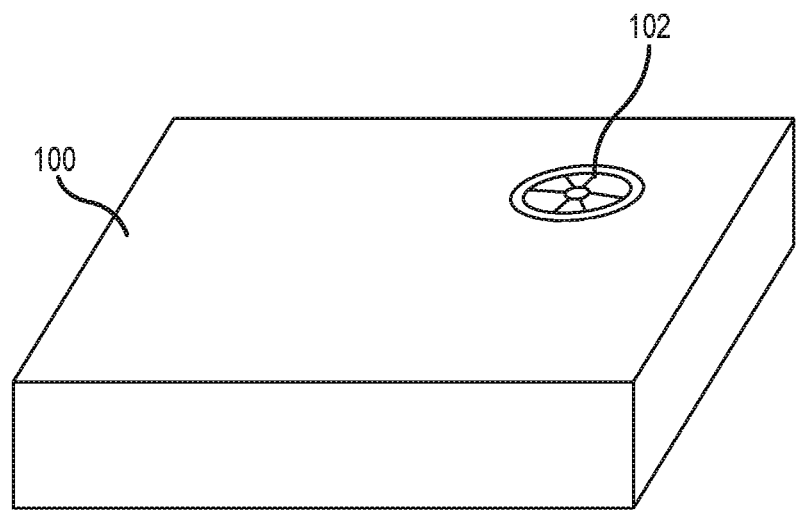
FIG. 1 depicts one embodiment of an aerogel compression pack.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention relate to an insulation and to insulation systems for pipes, storage tanks, and vessels. The insulation systems described herein utilize at least one layer of aerogel insulation to provide thermal and/or acoustic insulation. Aerogels, as described herein, include porous ultralight materials derived from gels, where a liquid component of the gel has been replaced with a gas. Aerogels can include silica, carbon-based aerogels, metal oxide aerogels, organic polymers, and the like. The aerogels used in the present invention are good thermal insulators because they significantly reduce the effects of conductive and convective heat transfer. Due to the large proportion of gases (which are poor heat conductors) within aerogels, the aerogels are good conductive insulators. Silica aerogel is an especially good insulator because silica is also a poor conductor of heat. The aerogels are good convective inhibitors because air cannot circulate through the lattice structure of the compounds.

The aerogel insulation may be in the form of aerogel compression insulation packets, aerogel thermal wraps, and/or aerogel blankets. In embodiments using aerogel compression insulation packs, a number of insulation packs may be arranged to cover a surface of a pipe or vessel. The insulation packs, in a compressed state, may be positioned generally adjacent one another, and may be covered with a constraining layer, such as a sheath layer or an additional layer of insulation. Once the constraining layer is covering the aerogel compression packs, the compression packs may be punctured, causing the compression packs to expand and fill the area between the pipe or vessel surface and the conforming layer. Oftentimes, additional layers will be provided on top of the aerogel layer(s). For example, other insulation layers, vapor barrier layers, and/or a protective cladding may be positioned around the aerogel layer(s). For example, embodiments may include an aerogel insulation layer surrounded by a constraining layer and a protective cladding. Other embodiments may include multiple aerogel insulation layers surrounded by a vapor barrier and/or a protective cladding. Additional layers may be provided as well.

As noted above, some aerogel insulation systems described herein use evacuated compression packs of aerogel particles as the first layer of insulation on cryogenic pipes and vessels. Once in place and covered by a rigid cellular glass or PIR foam layer (or other sheath or constraining layer), the vacuum is released by puncturing the compression packs (and in some cases the constraining layer) and the encapsulated aerogel expands to snuggly fill the annulus (or other shaped) space between the pipe or vessel and the rigid insulation covering. This first aerogel insulation layer absorbs noise radiating down the pipe or vessel and decouples the noise from the outer layers of the insulation system. In contrast, most conventional cryogenic acoustic insulation systems thermally insulate the pipe first and then add a separate acoustic treatment on top of the thermal insulator. The present system is advantageous as it decouples the vibrating pipe from the outer insulation as soon as possible rather than transferring it into a rigid insulation like cellular glass. The compression packs, often about 1 inch thick, act as a decoupler such that the use of further acoustic treatments may be minimized to achieve ISO 15667 acoustic performance.

In some embodiments, the aerogel compression packs may be prefabricated in a number of shapes and sizes. In some embodiments, each different size and/or shape of compression pack may have its own identifier. The identifier may be provided on the compression pack, such as by including a barcode or quick response (QR) code that represents the identifier. The number of different aerogel compression packs available may be limited, such as to between 5 and 20 different shapes and/or sizes such that an inventory of each of the variations may be easily stored for quick access. This allows vessels and pipes to be insulated with products that are presently on-hand, without needing custom sizes and shapes to be fabricated. This further reduces manufacturing costs, as only a limited number of sizes and shapes of compression packs must be produced. This allows the various compression packs to be easily and quickly identified and arranged for insulation.

For example, the arrangement of the prefabricated compression packs may be determined by computer analysis. In some embodiments, an architectural diagram describing an architectural layout of an industrial tank, storage vessel or piping system may be analyzed by a computer. Using an algorithm, the computer determines the dimensions of standardized limited set of insulation pieces that are needed to cover the majority (>95%) and up to all the area to be insulated. As noted above, each standardized insulation component may include unique identification. In order to facilitate rapid installation of each insulation piece, each piece is identified by a unique QR code; which is mapped to a particular uniform resource locators (URL). In some embodiments, the computer may solve a number of mapping solutions for each tank, vessel or pipe section to be insulated. Then the computer selects the insulation map solution that best fits the limited set of prefabricated insulation pieces. For example, the computer system may automatically map positions of a limited number pre-fabricated insulation pieces of various sizes and shapes to cover the surface. The map lays out each of the insulation pieces adjacent to one another so that they cover a geometric grid of the surface to be insulated. Each insulation piece may be mapped to coordinates of the geometric grid.

Turning now to FIG. 1, one embodiment of an aerogel compression insulation pack (compression pack) 100 is shown. Compression pack 100 may be in the form of a bag or other flexible container, which may be formed from nylon, polyethylene (PE), and/or other similar material, such as, but not limited to, high density polyethylene, polypropylene, polyester, metalized polyester, multilayer 2-7 layer coextruded film materials, MRE (Meals, Ready-To-Eat) film such as MIL PRF 22191 Type II Mylar/Poly film, and/or combinations thereof. The compression pack 100 may be filled with aerogel particles, such as, but not limited to, silica aerogel particles (i.e. Cabot® P200 aerogel particles, P300, and/or P400 aerogel particles). In some embodiments, Aerova® aerogel powder (available from JIOS Aerogel Corporation), or other alternative silica aerogels may be used alone or in combination with other aerogels. In some embodiments, the compression packs may include one or more filler materials or additives. As just one example, carbon black or other opacifier may be added to the aerogel particles to reduce static and to reduce thermal conductivity at temperatures near and above 0° F. In some embodiments, compression pack 100 may include a one-way valve 102. Once filled with insulation particles and any fillers, compression pack 100 may be put into a compressed state by introducing the compression pack 100 to a vacuum, such as by placing the compression pack 100 in a vacuum chamber. Air within compression pack 100 may be drawn out via the one-way valve 102, causing the bag or other container to compress around the aerogel particles. Upon removal of the compression pack 100 from the vacuum source, the one-way valve 102 prevents air from returning into the compression pack 100. Oftentimes, evacuated the compression pack 100 is compressed between about 10-20%, although greater compression rates may be achieved and may provide greater acoustic and/or thermal insulation.

The compression packs 100 are configured to be secured against a pipe or vessel and covered with a constraining layer, such as a sheath or insulation layer. For example, double-sided tape and/or other adhesive material may be used to secure each compression pack 100 against the pipe or vessel. After being secured and the constraining layer is positioned and secured, the compression pack 100 may be punctured with a sharp object, causing adjacent compression pack 100 to expand. The expansion of the compression packs 100 around the pipe or vessel causes the compression packs 100 to contact one another, providing a gapless, or substantially gapless, layer of insulation. In some embodiments, the compression packs 100 may include fasteners along one or more edges. The fasteners, such as snaps, hook and loop fasteners, adhesives, and the like, may be used to secure individual compressions packs 100 with one another. In other embodiments, multiple compression packs 100 may be secured together using lips molded into a constraining sheath layer. In other embodiments, multiple compression packs 100 may be covered by a single length of the constraining sheath circumferentially positioned around the pipe or vessel. The sheath ends may then be held together by snaps, metal strapping, filament tape, other fasteners, and/or combinations thereof. Oftentimes, compression packs 100 are less than about 1¼ inches thick, and in some embodiments, less than about 1 inch thick, such as between about 0.6 and 0.85 inches thick, although thinner compression packs 100 may be used that have thicknesses of less than about 0.6 inches.

It will be appreciated that compression packs may be produced in any combination of shapes and sizes to accommodate various pipe and vessel designs. For example, compression packs may be rectangular to be wrapped around cylindrical pipes and vessels. Oftentimes, tops and bottoms of storage vessels may have shapes that are not coverable by an array of rectangular pieces. Similarly, elbow joints and other joints of piping may be difficult to wrap with only rectangular compression packs. In such embodiments, non-rectangular compression packs, such as wedges and/or curved compression packs may be used, alone, or in combination with rectangular compression packs. Particular shapes and sizes of compression packs may be determined based on an analysis of the pipes and/or vessels to be insulated for a particular location. For example, computer analysis such as that described herein may be used to determine which shapes and sizes of compression packs are needed, as well as determine a particular arrangement of the compression packs for covering each particular pipe or vessel. This allows a small set of different of prefabricated compression packs to be manufactured and stored for insulating a full array of pipes and vessels, thus eliminating the need for the production of special customized compression packs for a particular application.

Figure 2:
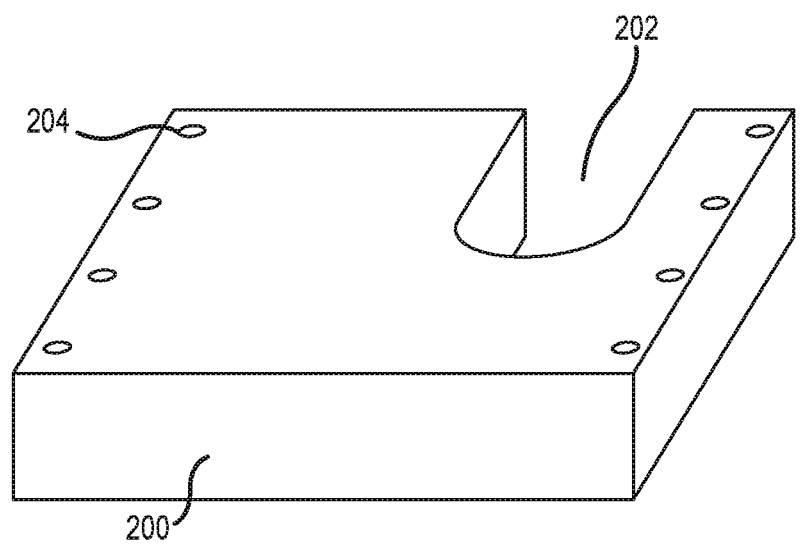
FIG. 2 depicts another embodiment of an aerogel compression pack.

In some applications, a vessel or pipe may include one or more feed pipes, valves, or other features that protrude from a main surface of the pipe or vessel. Similarly, openings or windows may be included in a surface of the pipe or vessel that must be accessible despite the insulation. In some embodiments, compression packs may be formed to accommodate such pipe or vessel features. For example, FIG. 2 shows a compression pack 200 that includes a cut-out portion 202 configured to be placed around a protrusion or other feature of a pipe or vessel. Cut-out portion 202 may be any shape or size and may be placed at any position on the compression pack 200. For example, while shown here with cut-out portion 202 extending to a side of the compression pack 200, in some embodiments, the cut-out portion 202 may define an aperture in a medial portion of the compression pack 200 through which the protruding feature may extend.

Figure 3:
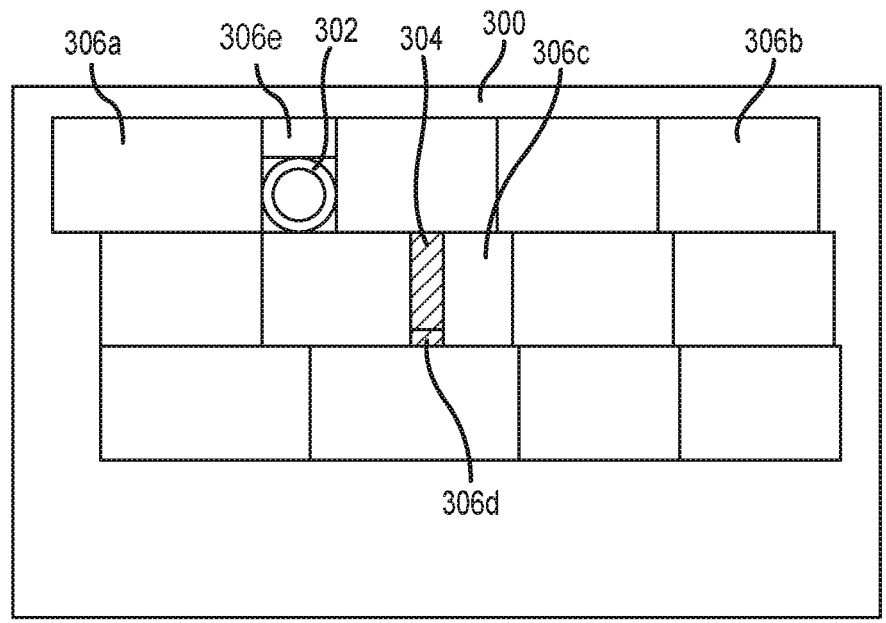
FIG. 3 depicts an arrangement of compression packs on a pipe or vessel according to embodiments.

In other embodiments, protrusions and other features of pipes and vessels may be accommodated by the placement of standard size and shapes of compression packs. For example, FIG. 3 shows a flattened view of a side wall of a vessel or pipe 300 having one or more feed pipes 302 and support structures 304. Here, a number of compression packs 306a-306e are arranged on the surface of vessel or pipe 300 so as to leave the feed pipes 302 and support structures exposed while leaving minimal amounts of the main surface of the vessel or pipe 300 uninsulated. For example, an arrangement of compression packs 306a, 306b, 306c, 306d, and 306e may be used to insulate all 1 or a majority (e.g. greater than about 90-95%) of the surface of vessel or pipe 300. In some embodiments, the arrangement of the compression packs 306a-306e (or any other shapes or sizes of compression pack) may be determined using computer analysis of the geometry of a the surface of the vessel or pipe 300 to be insulated. In instances where utilization of pre-formed compression packs 306 still leaves some small gaps without insulation, a product such as Cabot Thermal Wrap or other aerogel or non-aerogel insulation may be cut to a proper size and shape for insertion and securement within each gap. For example, one non-aerogel insulation that can be cut to size on the job and fit into the space is a resilient blanket sold as Anco TextraFINE® System 9000 Resilient Blanket manufactured by ANCO products.

Figure 4:
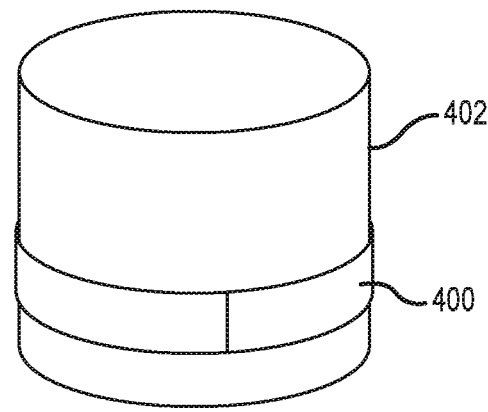
FIG. 4 depicts a thermal wrap that extends around a pipe or vessel according to embodiments.

In some embodiments, an aerogel insulation layer may be formed from a thermal wrap, thermal blanket, and/or other flexible insulation formed from a combination of aerogel praticles, filler materials, and/or binders. A thermal wrap or blanket 400 may be wrapped around a surface of a pipe or vessel 402, as shown in FIG. 4. One or more pieces of thermal wrap or blanket 400 may be cut to a proper size and flexed to cover any size and shape of pipe or vessel 402. Additionally, openings may be cut or otherwise formed into the thermal wrap or blanket 400 to accommodate protruding features and/or features that require access, such as gauges, valves, or viewing windows. Oftentimes, the thermal wrap or blanket 400 may include between about 60-90% aerogel particles and up to about 10-40% of filler and/or binder materials. For example, in one embodiments, approximately 70% (between 65-75%) of a thermal blanket 400 is made up of aerogel particles such as Cabot P300 particles, with the remaining portion being formed of heat-activated polyethylene covered polyester bicomponent fibers such as Trevia T255 that bind the aerogel particles to form the thermal blanket 400. In some embodiments, an Aspen Cryogel wrap having a thickness of between 5 and 10 mm and/or a Cabot Thermal Wrap Insulation having a thickness of between about 3 and 12 mm as described in U.S. Pat. No. 6,887,563, the entire contents of which is hereby incorporated by reference, may be used.

Typically, a constraining layer will be provided around an aerogel insulation layer, especially in embodiments where aerogel compression packs are used. The constraining layer may take many forms. For example, the constraining layer may be a thin sheath layer designed to hold the aerogel layer in place and/or to provide a vapor barrier. In other embodiments, the constraining layer may be an additional layer of insulation, such as a layer of cellular glass, polyisocyanurate (PIR) foam, and/or other insulation. The constraining layer helps to provide an outer barrier for the expansion of the aerogel compression packs. For example, the constraining layer is positioned around the aerogel layer prior to puncturing the compression packs. Upon puncturing the compression packs, the compression packs expand, but remain constrained between the pipe or vessel and the constraining layer. The constraining layer may also provide additional thermal and/or acoustic insulation and/or provide a vapor barrier for the aerogel layer.

Figure 5:
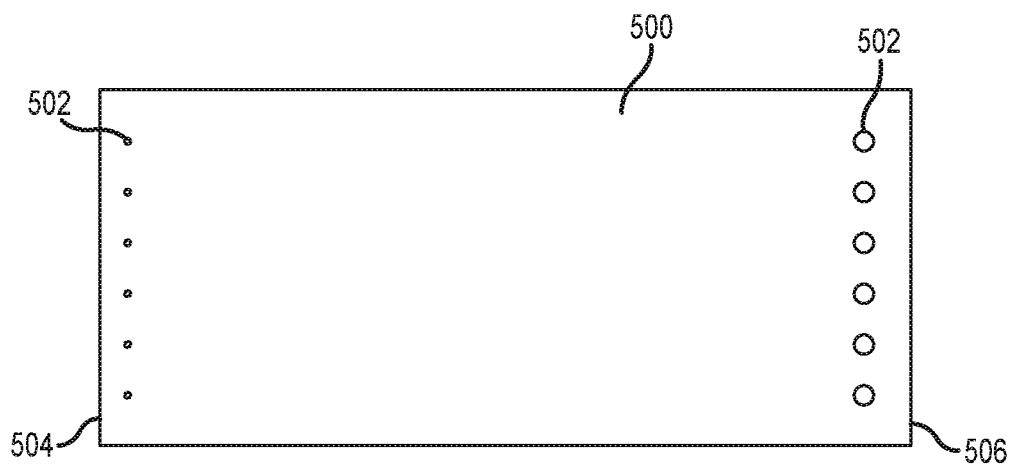
FIG. 5 depicts one embodiment of a sheath material.

FIG. 5 depicts a sheath layer 500. In some embodiments, sheath layer 500 may act as a constraining layer and/or a vapor barrier layer. The sheath layer 500 may be a single piece of material that may be wrapped completely around a pipe, vessel, and/or other insulation layer(s), such as an aerogel insulation layer. The sheath layer 500 may include one or more fasteners 502 that allow a first end 504 of the sheath layer 500 to be secured to a second end 506 of the same or a different sheath layer 500 once wrapped and secured around the pipe and/or vessel and/or other insulation layer(s). In some embodiments, the fasteners 502 may include snap connectors, with a male or female snap being positioned on the first end 504 and a opposite snap being positioned on the second end 506 for engagement with the snap on the first end 504. In other embodiments, the fasteners may include one or more adhesives (such as pressure sensitive adhesives), hook and loop fasteners, and/or other known fasteners. The key is to secure the sheath or constraining insulation layer in place so that is constrains the ability of the compression pack to expand in the Z direction so most of the expansion occurs between adjacent compression packs, where it expands and fills the gaps after the compression pack bag is punctured.

In some embodiments, sheath layer 500 may be formed from a plastic, such as a flexible polymer. As one example, a translucent wrap, such as high-density polyethylene (HDPE) may be used. Other materials such as, but not limited to, polyvinyl chloride (PVC) film, reinforced insulation facings such as Lamtec WMP-ASJ, vapor barrier materials such as Custom laminating 8923 facing or PITT-WRAP® SS jacketing, and/or combinations thereof can also be used for the sheath. Oftentimes, the sheath layer 500 is formed from a transparent or translucent material such that each aerogel compression pack may be visible through the sheath layer 500. This allows each of the packs to be easily identified to make puncturing each individual compression pack easier.

Figure 6:
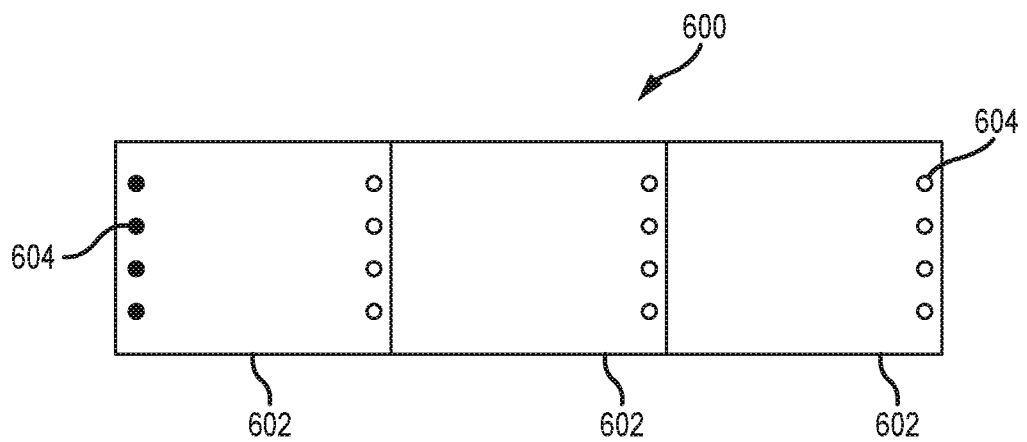
FIG. 6 depicts a number of pieces of sheath material attached in series according to embodiments.

In other embodiments, such as shown in FIG. 6, a sheath layer 600 may be formed of multiple pieces of sheath 602 that are secured together to wrap around a pipe or vessel. As just one example, a number of pieces of sheath 602 may be daisy-chained to form the sheath layer 600. This may be done, for example, by fastening overlapping ends of the sheaths 602 together, such as using snaps 604, adhesives, hook and loop fasteners, and/or other fastening mechanisms. In other embodiments, metal, nylon, plastic, and/or banding may be provided around the sheath layer 600 to secure the sheath layer 600 and/or aerogel insulation layer against a pipe or vessel. It will be appreciated that other known techniques for securing insulation may be utilized.

In embodiments where the sheath is used as a vapor barrier layer, the seams formed where ends of the sheath are secured, as well as other openings in the sheath layer, may be sealed. In embodiments where the ends are fastened together using an adhesive, the adhesive may help seal the seams. In addition, or as an alternative to using an adhesive, additional sealants, such as vapor barrier tape, caulks, and the like may be used to cover and seal the seams or to fill in the seams. Additionally, when used as a constraining layer, the sheath may be punctured along with the aerogel compression packs positioned underneath the sheath. The puncture holes in the sheath may also be filled, covered up, and/or otherwise sealed. In other embodiments, a vapor barrier may be formed by using a complete overwrap of the entire outside of the sheath layer with a self-stick vapor barrier, such as PITTWRAP® SS jacketing (70 mil thick self-sealing, modified bituminous membrane with 1 mil foil), Protecto Wrap® InsulSeal 50 vapor barrier (0.05 inches thick, self-adhering, exposable waterproofing membrane), and/or other vapor barrier having similar vapor resistant properties.

Figure 7:
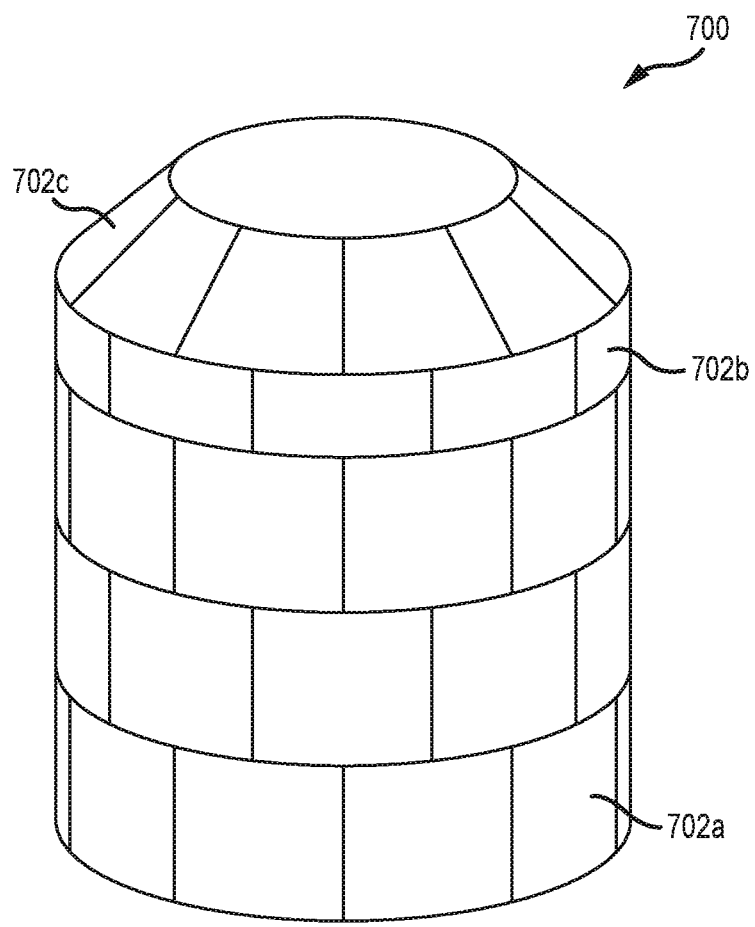
FIG. 7 depicts an arrangement of aerogel compression packs applied to a surface of a vessel according to embodiments.

FIG. 7 depicts one embodiment of aerogel insulation arranged around a vessel 700. Here, aerogel compression packs 702a having a uniform size and shape are used to cover a large portion of the sides of vessel 700. The aerogel compression packs 702a shown here may be rectangular such that when arranged as shown the compression packs 702a form a single layer that wraps around a circumference of the vessel 700. After one ring of compression packs 702a is positioned against and/or secured against the vessel 700, such as by using double sided tape applied between each compression pack 702a and the wall of the vessel, another ring of compression packs 702a may be stacked on top of the first ring to cover a new portion of the vessel 700. Oftentimes, a vessel 700 may not be coverable by a single size of compression packs 702a. As shown here, toward the top of the sides of vessel 700, a smaller size of compression pack 702b is positioned in a ring. Oftentimes, a pipe or vessel includes portions that require non-rectangular pieces to fully cover. Vessel 700 includes a tapered top portion atop the sides. Here, wedge-shaped compression packs 702c are arranged to cover the tapered top portion of vessel 700. Wider bottom edges of compression packs 702c may abut one another, with narrower top edges of the compression packs 702c abutting one another such that the bottom edge of the ring formed by compression packs 702c is wider than the top edge. Prior to puncturing the compression packs 702a-702c, constraining layer (not shown) may be secured around the compression packs 702a-702c.

It will be appreciated that the wedge (or trapezoid-shaped) compression packs 702c may also be used to cover a cylindrical surface, such as by alternating the wide and narrow ends of adjacent compression packs 702c. Such arrangements provide more flexibility in facilities that wish to limit the variety of prefabricated compression packs that are stored onsite. It will further be appreciated that various shapes of vessels and pipes may require use of similar or different shapes and sizes of packs. For example, triangular packs, packs with corresponding nesting shapes, and/or other shapes of compression packs may be used. Any size and/or shape pack may be prefabricated to fit a particular application, with the sizes and shapes often being determined by typical size and/or shape of pipes and/or vessels at a particular facility. This enables a good stock of each size to be on hand at all times without special fabrication requests, which may delay an insulation installation and/or result in increased costs for custom shapes and/or sizes of compression packs. The particular stock needed for a particular facility may be determined by computer analysis of the geometry of the pipes and/or vessels at the facility.

Figure 8:
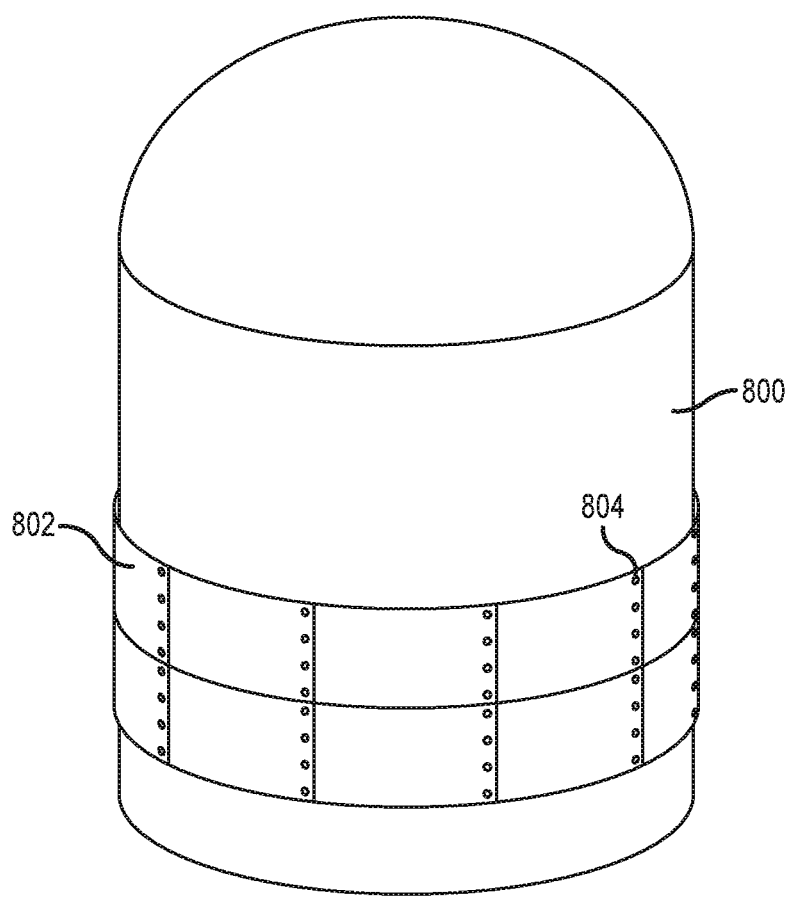
FIG. 8 depicts an arrangement of aerogel compression packs applied to a surface of a vessel according to embodiments.

FIG. 8 depicts multiple rings of compression packs 802 wrapped around an exterior of a vessel 800. Individual compression packs 802 may be daisy chained or otherwise fastened to form stacks of rings to cover the exterior of the vessel 800. In some embodiments, each compression pack 802 may be secured to the vessel 800, such as by using double sided tape, another adhesive, and/or other securement mechanism. The compression packs 802 may then be fastened to one another, such as by using fasteners 804 to completely cover a circumference of the vessel. In other embodiments, same-sized compression pack bags may be daisy chained together by heat welding the edge flaps together end to end. One way to daisy chain two or more compression packs 802 together is to attach the outer face of each compression pack 802 to a stretchable plastic film with about 100% or more strain capability in the machine direction. For example, a highly stretchable plastic film commonly made from Linear low-density polyethylene (LL-DPE) or stretchable polyurethane films may be used. An specific example of a stretchable plastic film with acrylic adhesive is All Weather Flashing Tape 8067 by 3M Company. The stretchy nature of the film holds the packs in position, permits expansion when the evacuated bags are popped, and readily permits use of non-sheath constraining layer materials such as cellular glass. Once each ring is formed around the vessel 800, a sheath or other constraining layer may be formed around the ring and the compression packs 802 may be punctured, causing the aerogel to expand against one another, the vessel 800, and the constraining layer. Multiple rings of insulation may be applied in a stacked fashion such that the entire exterior surface of the vessel 800 is covered with the rings of compression packs 802 secured to one another.

Figure 9:
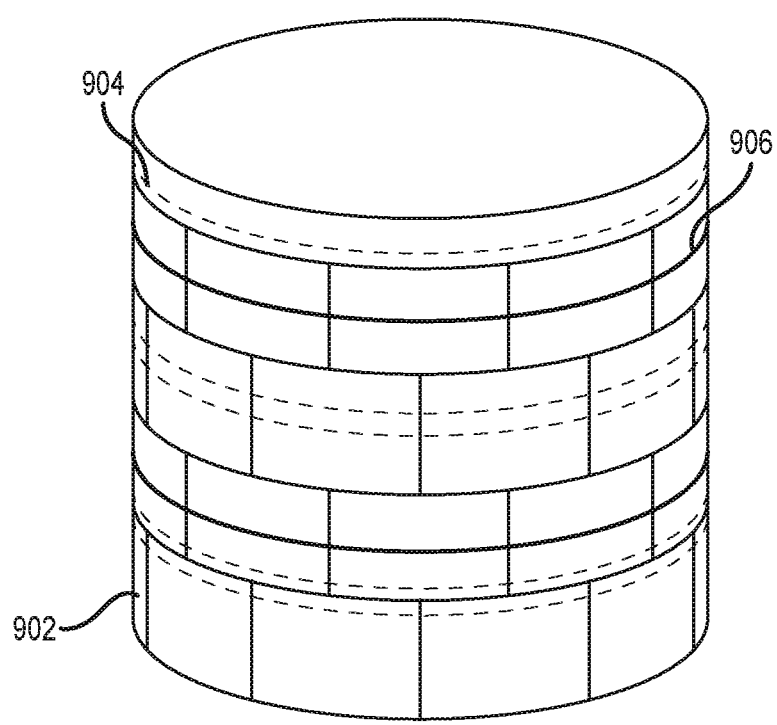
FIG. 9 depict insulation layers applied to a pipe or vessel according to embodiments.

In some embodiments, additional mechanisms may be provided to secure a sheath layer, and/or other constraining layer may be against the aerogel insulation layer and around to a pipe or vessel. As shown in FIG. 9, bands 906 may be wrapped around and secured around a constraining layer 904, which may be a sheath layer, insulation layer, vapor barrier, and/or other constraining layer. Constraining layer 904 may be used to support and constrain an aerogel insulation layer 902 against a pipe or vessel 900. The aerogel insulation layer 902 may include any form of aerogel insulation, such as aerogel compression packs, aerogel thermal wraps and blankets, and/or other forms of aerogel insulation. In some embodiments, the constraining layer 904 may be applied in general alignment with rings of the aerogel insulation layer 902. In other embodiments, such as shown here, the constraining layer 904 may be applied having a shingled overlap, such that a first ring of constraining layer 904 overlaps a previously applied ring of constraining layer 904. Each ring of constraining layer 904 may be applied such that it covers seams formed by the joining of stacked rings of the aerogel insulation layer 902. In some embodiments, the constraining layer 904 may be formed from strips of material that are wider than the rings of the aerogel insulation layer 902, while in other embodiments, the widths of the material may be substantially the same or smaller than the width of each ring of the aerogel insulation layer 902.

Oftentimes, the constraining layer 904 may be applied in strips that are between about 12 inches and about 36 inches wide, however other widths may be contemplated. In embodiments, where the aerogel insulation layer 902 is formed from aerogel compression packs, the constraining layer 904 may be secured at a predetermined circumference that is between about 5% and about 10% greater than a circumference of the aerogel compression packs. This additional space allows for some expansion of the compression packs once punctured, while still providing an outer support for the compression packs. The constraining layer 904 may be secured against a wall of vessel 900 using one or more bands 906. Bands 906 may be tightened, tied and/or otherwise secured against an outer surface of the constraining layer 904 at one or more locations on each constraining layer 904. Bands 906 may be formed of metal, plastic, nylon, and/or other material that may be tensioned to secure the constraining layer 904.

Figure 10A:
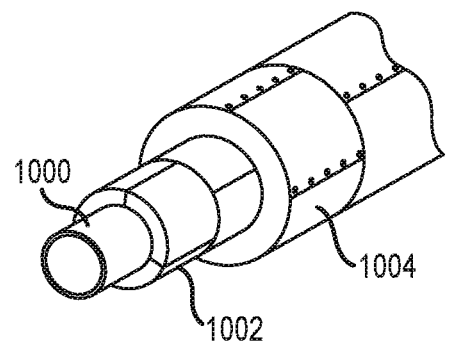
FIG. 10A is an isometric view of an insulation system according to embodiments.

FIG. 10A depicts one embodiment of an aerogel insulation system in accordance with the present invention. Here, a pipe 1000 is surrounded by an aerogel insulation layer 1002. Aerogel insulation layer 1002 may include any form of aerogel insulation described herein, such as aerogel compression packs, aerogel blankets, and/or aerogel thermal wraps. In some embodiments, the aerogel insulation layer may be secured directly to the walls of pipe 1000, such as by using double stick tape, another adhesive, and/or other securement technique. In embodiments where an aerogel thermal wrap or blanket is used, ends of the wrap or blanket may overlap with one another and be fastened together around the circumference of pipe 1000 to form a complete ring of insulation around the pipe 1000. Fastening mechanisms such as snaps, adhesives, tape, hook and loop fasteners, and the like may be used. In embodiments where aerogel compression packs are used, ends of each compression pack may abut each other and/or be secured to one another, such as in daisy-chain fashion.

Figure 10B:
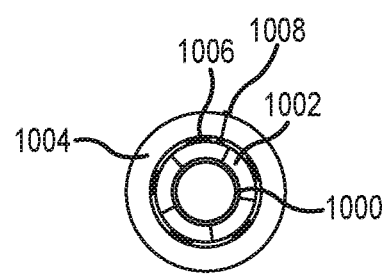
FIG. 10B is a top view of the insulation system of FIG. 10A.

Aerogel insulation layer 1002 is surrounded by a constraining layer 1004. Constraining layer 1004 may be a layer of sheath material as shown here, or may be another constraining material such as a vapor barrier or layer of additional insulation material. In embodiments where the constraining layer 1004 is a sheath material, the constraining material may be secured to the aerogel insulation layer 1002 using double stick tape 1006 as shown in FIG. 10B, although other adhesives and/or other securement mechanisms may be used. As another example, one or more bands may be placed around the constraining layer 1004 for securement against the aerogel insulation layer 1002. In some embodiments, the constraining layer 1004 may be formed from one or more pieces of sheath material. Each piece of sheath material may include one or more fastening mechanisms on one or both ends of the sheath material, allowing the sheath material to be fastened together or daisy chained to form a continuous ring of constraining layer 1004 around the aerogel insulation layer 1002. In some embodiments, the fastening mechanisms may include one or more snaps 1008 that may be used to fasten the ends of sheath material together. In other embodiments, the fastening mechanisms may include hook and loop fasteners, tape, adhesives, and/or other securement mechanisms. While not shown, typically the insulation system will include some form of protective cladding surrounding the various layers. For example, a cladding formed of one or more layers of mass loaded vinyl bonded to a metal jacketing, a metal layer only, and/or other protective material may be provided around the constraining layer 1004 and the aerogel insulation layer 1002. Additional layers may be provided in the insulation system as well. For example, one or more vapor barrier layers (especially in systems where the constraining layer 1004 is an additional insulation layer), additional insulation layers, additional layers of aerogel insulation, additional sheath layers and/or other layers may be provided. The inclusion and arrangement of additional layers may be determined based on various factors, such as the level of thermal, vapor, and/or acoustic insulation needed, space constraints, cost, and the like.

Figure 11A:
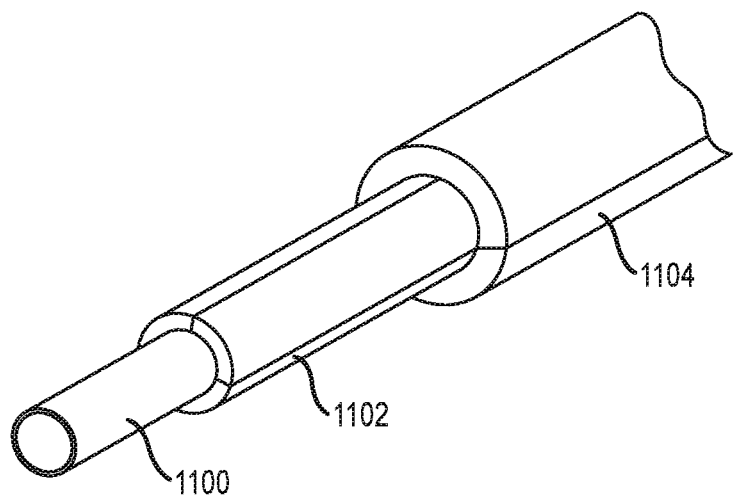
FIG. 11A is an isometric view of an insulation system according to embodiments.
Figure 11B:
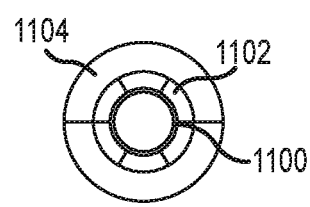
FIG. 11B is a top view of the insulation system of FIG. 11A.

FIG. 11A depicts another embodiment of an aerogel insulation system in accordance with the present invention. Here, an aerogel insulation layer 1102 is positioned around and secured to a pipe 1100. For example, double stick tape 1006 may be applied between the aerogel insulation layer 1102 and the pipe 1100 as shown in FIG. 11B. Turning back to FIG. 11A, an additional insulation layer 1104 is applied against an outer surface of the aerogel insulation layer 1102. For example, an additional insulation layer 1104 of PIR foam and/or cellular glass pieces may be applied to the aerogel insulation layer 1102. In some embodiments, the space between the inner aerogel layer and an outer non aerogel insulation layer may include a non-abrasive material and/or treatment. For example, an inner surface of the additional insulation layer 1104 may include an asphalt, especially in embodiments using cellular glass pieces. Such treatments help minimize the amount of abrasion of the inner surface of the cellular glass insulation on the aerogel insulation layer 1102 as the insulation expands and contracts with temperature changes. The additional insulation layer 1104 may act as a constraining layer for the aerogel insulation layer 1102. For example, in embodiments utilizing a number of aerogel compression packs as the aerogel insulation layer 1102, the additional insulation layer 1104 may be positioned against the compression packs prior to puncturing the compression packs. This allows the compression packs to expand against the additional insulation layer 1104, thereby filling any space between the two layers. Oftentimes, a vapor barrier layer will be positioned outside of an outermost layer of insulation material. Oftentimes, a protective cladding may be applied as an outermost layer of the insulation system. Additional layers, such as sheaths, vapor barrier layers, and/or additional insulation layers (aerogel or otherwise) may be included to fit the needs of particular application.

Figure 12A:
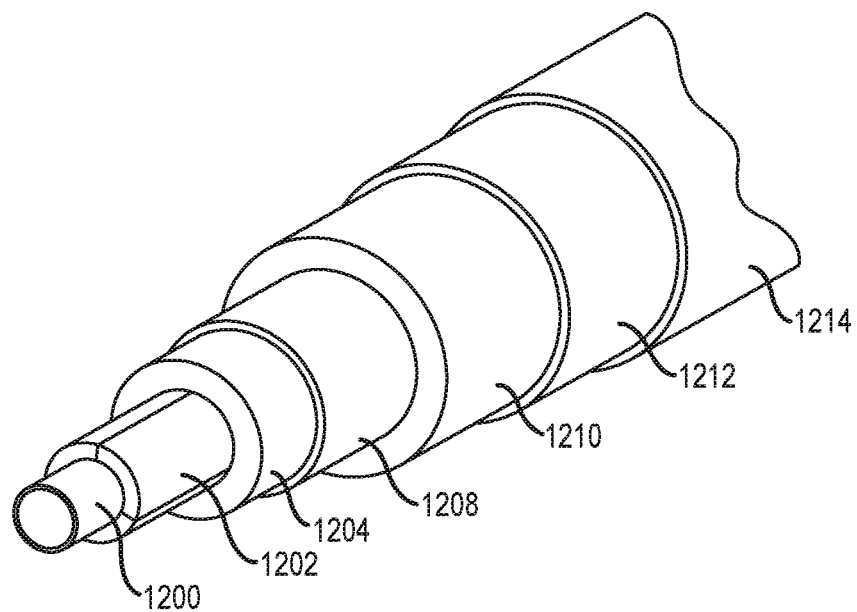
FIG. 12A is an isometric view of an insulation system according to embodiments.
Figure 12B:
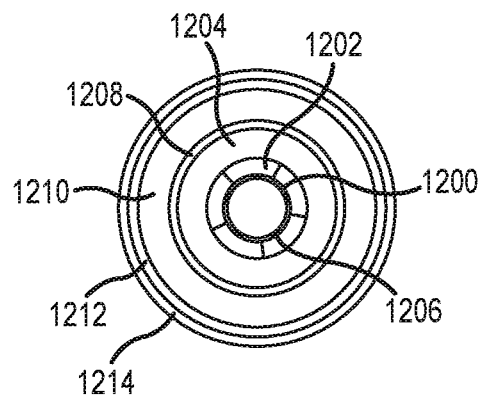
FIG. 12B is a top view of the insulation system of FIG. 12A.

FIG. 12A depicts another embodiment of an aerogel insulation system in accordance with the present invention. An aerogel insulation layer 1202 is secured against a pipe 1200. In some embodiments, the aerogel insulation layer 1202 may be secured using double stick tape 1206 and/or other adhesive or fastener as shown in FIG. 12B. Turning back to FIG. 12A, the aerogel insulation layer 1202 may include one or more aerogel compression packs, an aerogel thermal wrap or blanket, and/or other aerogel insulation. An additional insulation layer 1204 may be provided around the aerogel insulation layer 1202. The additional insulation layer 1204 may be formed of PIR foam, cellular glass pieces, and/or other insulation materials. In embodiments using cellular glass pieces, an inner surface of the cellular glass insulation may be asphalt coated and/or similarly treated to reduce the effects of abrasion. The additional insulation layer 1204 may not only provide additional thermal and/or acoustic insulation, but may also serve as a constraining layer that helps limit the amount of expansion of aerogel compression packs once punctured. In some embodiments, an optional sheath and/or vapor barrier layer 1208 may be positioned around the additional insulation layer 1204 and the aerogel insulation layer 1202. The vapor barrier layer 1208 helps prevent the aerogel insulation layer 1202 and additional insulation layer 1204 from being exposed to vapor or moisture. A further insulation layer 1210 of insulation, such as PIR foam, cellular glass pieces, and/or other insulation material, may be positioned around the vapor barrier layer 1208 and/or the additional insulation layer 1208. In some embodiments, the additional insulation layer 1204 and the further insulation layer 1208 may be formed from the same type of material, while in other embodiments different materials are selected for each layer. A vapor barrier layer 1212 may be applied around the further insulation layer 1210. A protective cladding 1214 may be applied as an outer layer surrounding the rest of the insulation system. In some embodiments, cladding 1214 may be formed of one or more layers of mass loaded vinyl bound to a metal jacketing, a metal layer only, and/or other combinations of protective materials may be used to form cladding 1214. Additional examples of protective cladding materials may include, but are not limited to, aluminum jacketing at 0.01-0.063" thick as described in detail per ASTM C1729-16, stainless steel jacketing at 0.012-0.050" thick per ASTM C1767-16 and ASTM1767M-16, laminate protective jacketing per ASTM C1775-14, chlorosulfonated polyethylene non-metallic jacketing available from ULVA Insulation Systems LTD, and/or combinations thereof.

Oftentimes, the aerogel insulation layer 1202 may be less than about 1¼ inches, and in some embodiments, less than about 1 inch thick. Each layer of additional insulation may be between about 1 and 3 inches thick, with a thickness of about 2 inches being common. Each of the vapor barrier layers 1208 and 1212, and protective cladding 1214 may be less than 0.5 inches thick, oftentimes being significantly thinner. For example, each vapor barrier layer may have a thickness of less than about 0.07 inches and the cladding 1214 may be between about 0.01-0.063 inches thick. Such thicknesses for each layer enable enhanced acoustic and thermal insulation properties while maintaining a relatively thin insulation system. As just one example, such thicknesses enable an aerogel insulation system to include a layer of aerogel compression packs, a layer a cellular glass or PIR foam insulation, a vapor barrier layer, a second layer of cellular glass or PIR foam insulation, and a mass loaded vinyl bound to a metal cladding while maintaining a combined thickness of less than 6 inches, and more commonly less than about 5.5 inches.

In some embodiments, a computer is used to take an architectural diagram describing an architectural layout of an industrial tank, storage vessel or piping system and automatically map positions of a standardized limited set of pre-sized insulation pieces to cover the surface to be insulated. The map lays out each of the insulation pieces adjacent to one another so that they cover a geometric grid of the surface to be insulated. Each insulation piece is mapped to coordinates of the geometric grid.

The computer is used to solve a plurality of mapping solutions for each tank, vessel or pipe section to be insulated. Then the computer selects from the plurality of mapping solutions the insulation map solution that best fits the limited set of pre-sized insulation pieces. Using an algorithm the computer is used to determine the dimensions of standardized limited set of insulation pieces that are needed to cover the majority (>95%) and up to all the area to be insulated. Each standardized insulation component includes unique identification. In order to facilitate rapid installation of each insulation piece, each piece is identified by unique QR codes, which may be tied to URLs.

Figure 13:
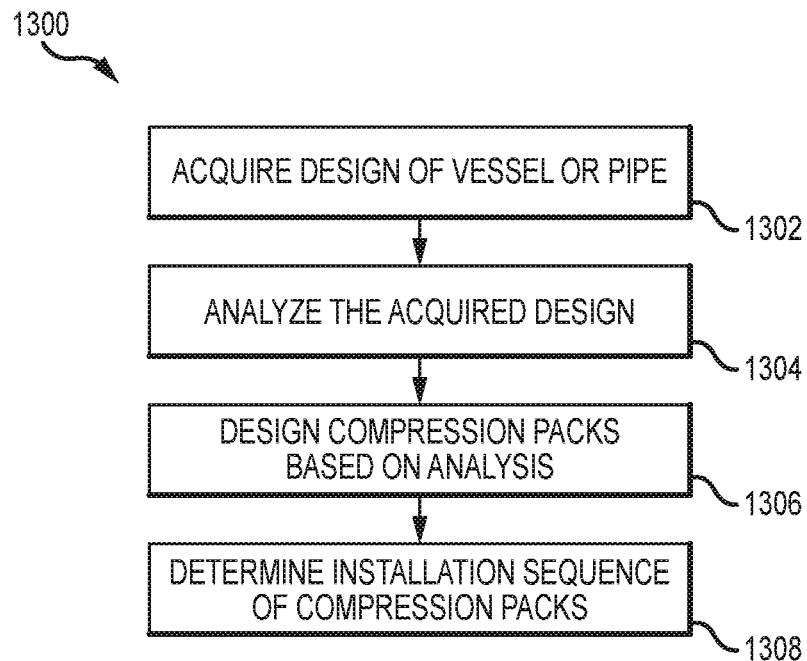
FIG. 13 is a flowchart depicting a computerized process for mapping out the installation of aerogel insulation around a pipe or vessel according to embodiments.

FIG. 13 is a flowchart depicting a computerized process 1300 for mapping out the installation of aerogel insulation around a pipe or vessel. Process 1300 may be used to cover any type of structure or conduit with aerogel insulation packets using an existing inventory of prefabricated aerogel compression packs of various shapes and sizes. Process 1300 may begin by getting a design of a vessel or pipe to be insulated at block 1302. The design may be imported from a previously created computer aided drafting (CAD) file of the tank or vessel and/or may be created as part of process 1300. The geometry of the vessel or pipe, including any unique protrusions, access points, or other features, may be analyzed at block 1304. At block 1306, the computer may design compression pack pieces (or select existing pieces) to insulate the vessel or pipe. A sequence of installation of the compression packs may be determined at block 1308. If the compression packs were newly designed rather than preexisting pieces, the compression packs may be designed and labeled with an identifier that is indicative of an installation order. The computer may optimize the insulation design such that a minimum number of compression pack sizes are required to insulate each vessel or pipe. If the compression packs were preexisting pieces, the computer may retrieve identifiers associated with the existing pieces and provide an installation plan using the corresponding identifiers. The installation plan may then be followed to cover the pipe or vessel with the desired pattern of aerogel insulation packs.

In some embodiments, the computer may create comparative insulation options using insulation materials such as aerogel thermal wraps or blankets, cellular glass and PIR foam. For each insulation option the computer may compile a material list, a material cost breakdown, an install time, and cost estimate. The computer may provide engineering detail related to characteristics such as thermal performance, fire ratings, and acoustical performance. This comparative insulation options may be used to make an informed decision on what build of insulation system to use.

Figure 14:
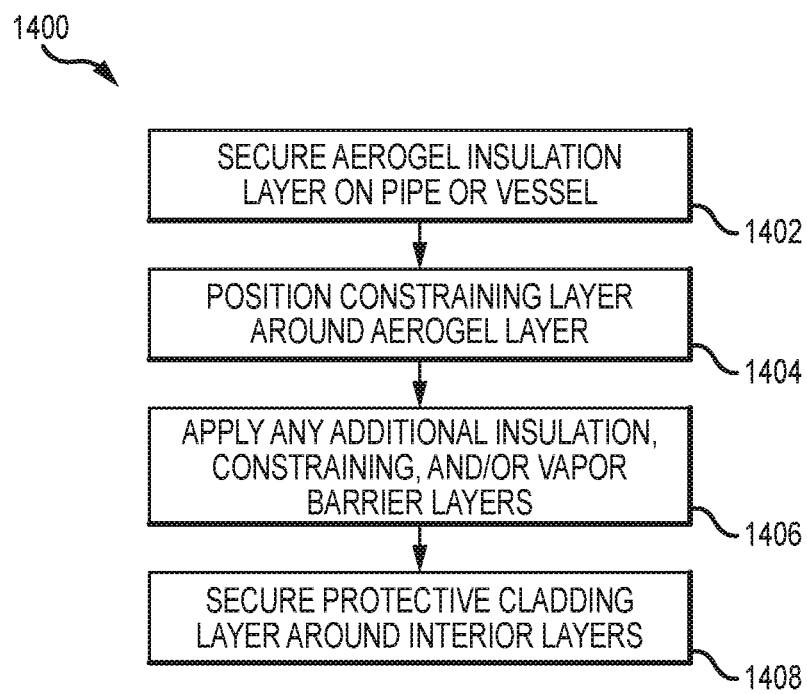
FIG. 14 is a flowchart depicting a process for installing an aerogel insulation system according to embodiments.

FIG. 14 is a flowchart depicting a process 1400 for installing an aerogel insulation system. Process 1400 may be used to install any of the insulation products and systems described herein. At block 1402, an aerogel layer may be secured around a length of the pipe or vessel. In some embodiments, this may be done by applying double sided tape or another adhesive between the aerogel layer and the exterior surface of the pipe or vessel to hold the aerogel layer in place while other layers are installed. The aerogel layer may include one or more types of aerogel insulation. For example, the aerogel layer may include a number of aerogel compression packs, a thermal wrap or blanket, and/or other aerogel insulation product. In the case of aerogel compression packs, the layout of the compression packs may be determined based on computer analysis, such as that described in relation to FIG. 13. The aerogel layer may be applied all at once and/or in individual rings or other sections of aerogel insulation.

In some embodiments that use prefabricated aerogel compression packs, some small areas of the pipe or vessel may not be covered by aerogel packets due to the limited number of shapes and sizes available to form a pattern to cover the pipe or vessel. In such cases, small pieces of other aerogel insulation, such as thermal wrap or blanket may be cut to size and placed within the gaps to insulate the remaining surface area of the pipe or vessel.

Once the aerogel layer is secured to the pipe or vessel, a constraining layer may be positioned and secured around the aerogel layer at block 1404. The constraining layer may be a sheath or vapor barrier material and/or may be an additional layer of insulation. For example, a thin translucent sheath or vapor barrier layer may be positioned around the aerogel layer. In other embodiments, an additional layer of insulation, such as PIR foam and/or cellular glass pieces may serve as a constraining layer for the aerogel layer. In some embodiments using cellular glass pieces as the constraining layer, an inner surface of the cellular glass insulation may be asphalt coated and/or similarly treated. Such treatments help minimize the amount of abrasion of the inner surface of the cellular glass insulation on the aerogel layer. In embodiments where the aerogel layer is formed of a number of aerogel compression packs, once the constraining layer is applied, the compression packs (and oftentimes the constraining layer) may be punctured. This allows the compression packs to expand and fill any voids between one another, as well as any voids existing between the aerogel layer, the constraining layer, and the pipe or vessel. In some embodiments, an exposed end of an aerogel compression pack may be punctured to eliminate the need to puncture the constraining layer. Oftentimes, the constraining layer is positioned such that the aerogel compression packs may expand between about 5% and 10% before contacting the constraining layer. In some embodiments, a sealing caulk, tape, and/or other substance may be applied to any seams in the constraining layer and/or any puncture holes, thereby allowing the constraining layer to form a vapor barrier seal or generally greater vapor resistance. Oftentimes the constraining layer may be installed such that its edges are staggered relative to seams of the aerogel layer. This helps further seal the insulation system against vapor.

In some embodiments, additional insulation layers, vapor barrier layers, aerogel layers, constraining layers, sheath layers, and/or other layers may be applied to the insulation system. For example, process 1400 may include positioning a vapor barrier layer around the constraining layer at block 1406. This may be particularly useful when the constraining layer is an additional insulation layer, such as PIR foam and/or cellular glass pieces. Such a process may be used to form the insulation products described in relation to FIGS. 11A-12B. Multiple vapor barrier layers may be applied at various places within the insulation system. Some embodiments, process 1400 may include applying an additional insulation layer, such as PIR foam and/or cellular glass pieces, around the aerogel layer and the constraining layer. Any number of additional insulation layers may be applied to the insulation system. In some embodiments, multiple aerogel layers may be included. Oftentimes, each aerogel layer may be surrounded by a separate constraining layer. This allows each aerogel layer to be punctured for expansion once constrained. Once the length of pipe or vessel is insulated, another adjacent length of pipe or vessel may be insulated.

After all of the interior layers of insulation product have been installed, a protective cladding layer may be secured around the aerogel layer, the constraining layer, and any other interior layers at block 1408. The protective cladding layer may include a metal jacket and/or one or more layers of mass weighted vinyl material. The protective cladding may not only provide a durable and/or vapor resistant exterior, but may also provide a uniform, aesthetically pleasing outer surface for the insulation system. Oftentimes, a vapor barrier layer may be positioned immediately adjacent an inside surface of the protective cladding layer. Elbows, tees, and values may be double layer insulated using similar techniques as long as any inner aerogel compression packs are accessible on their ends to permit expansion.

It will be appreciated that additional foam insulation and vapor barrier layers may be added as needed for a particular application. For example, a pipe or vessel that is used in conjunction with a liquid ammonia solution, an aerogel insulation system may only need one aerogel layer, one layer of PIR foam or glass, one continuous vapor barrier layer, and one layer of finished cladding. For a colder liquid nitrogen gas (LNG) application, an aerogel insulation system having an additional layer of foam or glass and a secondary vapor barrier layer within the cladding may be required.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. An insulation product for a pipe or vessel, the insulation product comprising:
at least one aerogel insulation layer comprising a plurality of aerogel compression insulation packets, each of the plurality of aerogel compression packets comprises a flexible container that houses a plurality of aerogel particles, and wherein prior to installation each of the plurality of aerogel compression insulation packets is vacuum sealed and upon installation each of the plurality of aerogel compression packets the vacuum seal is broken, thereby enabling the plurality of aerogel compression insulation packets to expand to fill any gaps formed within the at least one aerogel insulation layer;
a first additional insulation layer positioned around the at least one aerogel insulation layer;
a sheath layer positioned between the at least one aerogel insulation layer and the first additional insulation layer;
a second additional insulation layer positioned around the first additional insulation layer; and a protective cladding layer surrounding the at least one aerogel insulation layer and the first additional insulation layer.

2. The insulation product for a pipe or vessel of claim 1, further comprising:
a vapor barrier layer positioned adjacent an outer surface of the second additional insulation layer.

3. The insulation product for a pipe or vessel of claim 2, further comprising:
a further insulation layer positioned around the vapor barrier layer.

4. The insulation product for a pipe or vessel of claim 1, further comprising:
a sheath layer positioned between the at least one aerogel insulation layer and the first additional insulation layer.

5. The insulation product for a pipe or vessel of claim 4, wherein:
the sheath layer comprises polyethylene.

6. The insulation product for a pipe or vessel of claim 1, wherein:
the first additional insulation layer comprises one or more of cellular glass and a thermoset plastic foam.

7. The insulation product for a pipe or vessel of claim 1, wherein:
a space between the at least one aerogel layer and the first additional insulation layer comprises one or both of a non-abrasive material or a non-abrasive treatment.

8. The insulation product for a pipe or vessel of claim 1, wherein:
the at least one aerogel insulation layer comprises aerogel compression insulation packets; and
the aerogel compression insulation packets have a thickness of between about 0.25 inches and about 1.5 inches in an expanded state.

9. The insulation product for a pipe or vessel of claim 1, wherein:
the protective cladding layer comprises mass loaded vinyl bounded to a metal jacket.

10. An insulation product for a pipe or vessel, the insulation product comprising:
at least one aerogel insulation layer;
a first additional insulation layer positioned around the at least one aerogel insulation layer;
a sheath layer positioned between the at least one aerogel insulation layer and the first additional insulation layer;
a second additional insulation layer positioned around the first additional insulation layer;
a vapor barrier layer positioned adjacent an outer surface of the second additional insulation layer; and
a protective cladding layer surrounding the at least one aerogel insulation layer, the first additional insulation layer, the second additional insulation layer, and the vapor barrier layer.

11. The insulation product for a pipe or vessel of claim 10, wherein:
the vapor barrier layer is a first vapor barrier layer; and
the insulation product further comprises a second vapor barrier layer positioned between the first additional insulation layer and the second additional insulation layer.

12. The insulation product for a pipe or vessel of claim 10, wherein:
the at least one aerogel layer comprises carbon black.

* * * * *